US008855996B1

(12) United States Patent
Van Dijke et al.

(10) Patent No.: US 8,855,996 B1
(45) Date of Patent: Oct. 7, 2014

(54) COMMUNICATION NETWORK ENABLED SYSTEM AND METHOD FOR TRANSLATING A PLURALITY OF INFORMATION SEND OVER A COMMUNICATION NETWORK

(71) Applicants: Daniel Van Dijke, Apeldoorn (NL); Martin Fengler, St. Gallen (CH)

(72) Inventors: Daniel Van Dijke, Apeldoorn (NL); Martin Fengler, St. Gallen (CH)

( * ) Notice: Subject to any disclaimer, the term of this patent is extended or adjusted under 35 U.S.C. 154(b) by 0 days.

(21) Appl. No.: 14/179,859

(22) Filed: Feb. 13, 2014

(51) Int. Cl.
*G10L 15/00* (2013.01)

(52) U.S. Cl.
USPC .................................... 704/8; 704/2; 715/758

(58) Field of Classification Search
USPC ........................................... 704/2, 8; 715/758
See application file for complete search history.

(56) References Cited

U.S. PATENT DOCUMENTS 6,385,586 B1 * 5/2002 Dietz ........................... 704/277
7,469,381 B2 12/2008 Ording
7,930,407 B2 4/2011 Ragnet et al.
8,024,211 B1 9/2011 Cohen
8,527,258 B2 9/2013 Kim et al.
2002/0095292 A1 7/2002 Mittal et al.
2002/0169592 A1 * 11/2002 Aityan ............................. 704/2
2006/0265652 A1 * 11/2006 Seitz et al. .................... 715/703
2010/0185434 A1 * 7/2010 Burvall et al. .................... 704/3
2012/0069131 A1 3/2012 Abelow
2012/0117587 A1 5/2012 Pedlow et al.
2012/0210245 A1 8/2012 McCoy et al.
2013/0006602 A1 * 1/2013 Zhu et al. .......................... 704/2
2013/0110547 A1 5/2013 Englund et al.
2013/0231914 A1 9/2013 Powalowski
2013/0304616 A1 11/2013 Raleigh et al.

* cited by examiner

*Primary Examiner* — Daniel D Abebe
(74) *Attorney, Agent, or Firm* — Andrew Alia, Esq.

(57) ABSTRACT

Disclosed communication network enabled system and method for connecting pluralities of users for translating information sent over a communication network comprising a mobile application installed in a portable mobile communication device for receiving the information from the users. A first time user can specify input language and the desired translated output language into the mobile application. The translation request notification information is routed and sent to top tier users selected from a ranked list by a server as a push notification. The first one to respond is connected to the user. The translator can set the frequency of translation requests and can charge for each translation. After the translation is completed the user can rate the translator which will help the translator to get new requests. Too many bad reports about the translation of a user will get that user blocked.

19 Claims, 7 Drawing Sheets

Figure 1:
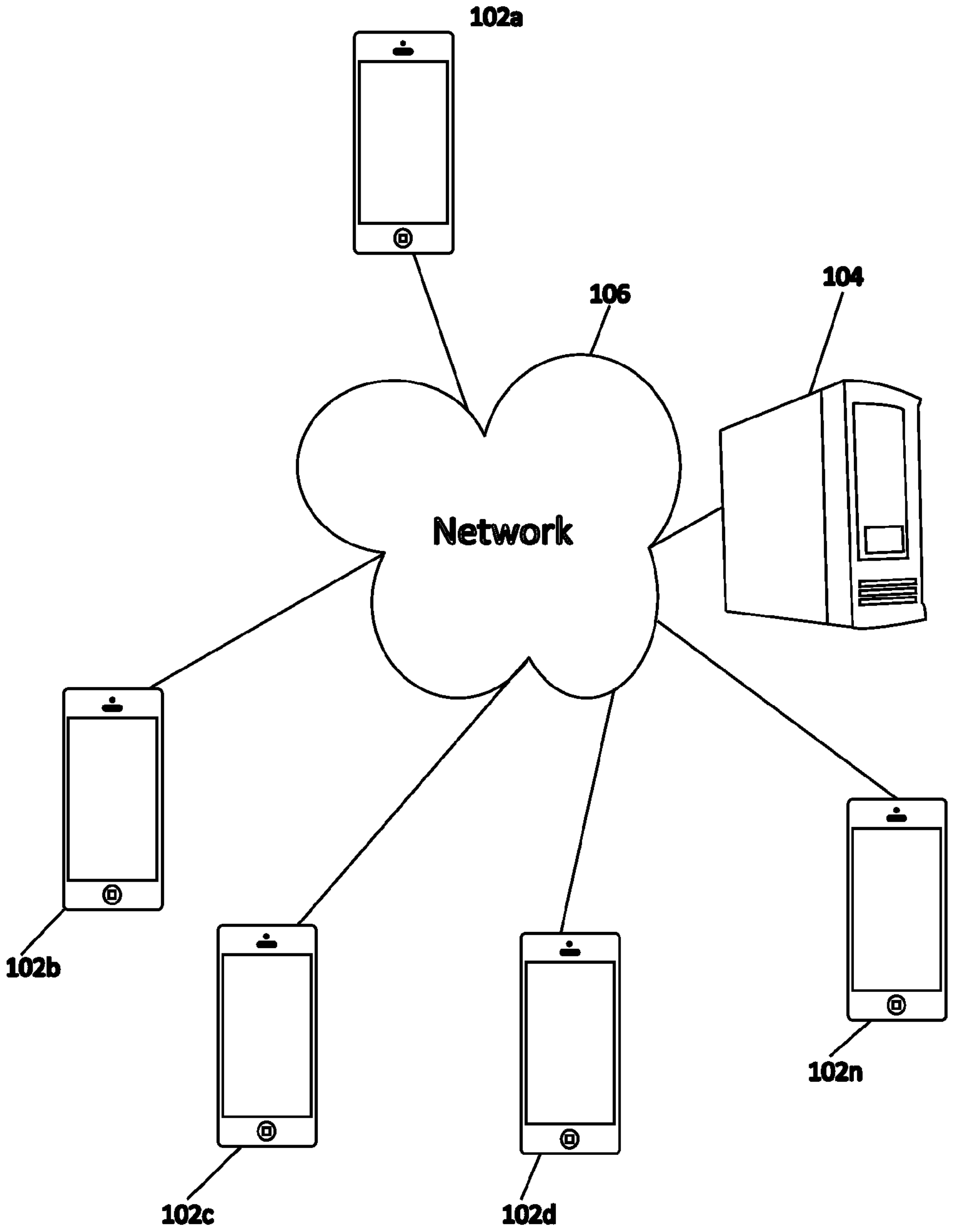

COMMUNICATION NETWORK ENABLED SYSTEM AND METHOD FOR TRANSLATING A PLURALITY OF INFORMATION SEND OVER A COMMUNICATION NETWORK

BACKGROUND

The present invention relates to a system and method for translating a plurality of information and more particularly to a communication network enabled system and method for translating the plurality of information from one language to another by a plurality of users using an application program.

Although English is the most universal language right now, the use of other regional languages is still persistent. There are places where the information is only available in regional languages. There exists situations in which a foreigner may face problems such as while asking for directions, in negotiations, in resolving problems in hotels, hospitals, provide help in understanding foreign documents, etc. without knowing the regional language. It is difficult for one to learn more languages and it requires a lot of effort from the learner's side. A good translation program can acts as a local guide on holidays, acts as a translator in negotiations, can help in resolving trouble in hotels, restaurant conversations, accidents and in other emergency situations. However exiting translation programs only offer translation of words between languages and hence cannot be used in these kinds of situations and also they are not much reliable in conveying the correct meaning of a sentence.

The capabilities of mobile devices and communication systems have rapidly increased in recent years in terms of processing power, connectivity and data transfer speeds. Each language does have their own language variation among social groups' dialects and the grammaticalization may differ among different social groups. In these worst situations no existing translation method and software can be a good replacement for a local person. Using existing language translation applications may not provide satisfactory translated outputs. However some advanced language translation applications help the users up to an extent for understanding the local language during travel. These translator apps for mobile devices require each user to subscribe or buy the app which would result in spending much money. Some exiting apps are really a speech translator, so it focuses on conversations. It's available in only a limited number of different pairs of languages and has a limited vocabulary of words. One of its advantages is that it needs no Internet connection to access it. It comes with a voice-recognition system and an interface. You just speak in one language and it speaks back in another, and it has unlimited translations. However, in addition to the above said drawbacks, this app may sometimes find difficulty in understanding different dialects and hence they cannot be efficiently used for translation. The user also needs to pay a fixed monthly amount irrespective of the frequency of usage of the application.

Some other free translation apps have a database of a large number of languages and it access dictionaries with authoritative translations in different languages as well as giving spoken translations in multiple languages. The user just has to talk into the microphone of his/her phone and it will give the translation. Although you have to be connected to the internet it allows saving user's favorite translations so that he/she can check them when they are not online. It allows the user to have nearly natural conversations with people in a foreign language. However, the voice-recognition system is not so effective in understanding different dialects and speech without any grammaticalization. Moreover, the languages and vocabulary available is still limited.

In some cases the information that will need to be translated may be in an image, video or random text. In this case existing apps fail to translate almost all the requests given to them. Further, most of the translation apps do not receive any image and video for translation. To translate this information, usually the information is sent to a third person for translation. However, it is very difficult to find a third person who can translate the information correctly every time. Moreover, there is no authenticity of the translated information given by the third person. Hence it appears that users are not yet fully benefiting from the potential interactive features of mobile devices and translating apps, interactive text recognition and translation on a mobile device.

Thus, there exists a need for an improved system and method of efficiently translating information during travel and other situations. Moreover, the needed system would be used to correctly translate available information between a large number of languages. In addition, the needed system would be easily operated by anyone without having to know multiple languages.

Further, the needed system would be cost effective, simple, user-friendly, can easily be set up, and can be universally employable for translating information. In addition, the needed system and method would possibly be used to correctly translate information available in various social groups' dialects and grammaticalization. Further, the needed system would translate information available in the forms of audio, image, text and video. Moreover, the needed system would act as a local guide for translating the information available in different dialects. The present invention addresses such a need.

SUMMARY

The present invention is a communication network enabled system and method for connecting a pluralities of users for the purpose of translating a plurality of information sent over a communication network. The communication network enabled system comprises a mobile application installed in a portable mobile communication device for receiving the plurality of information from the plurality of users. The communication network enabled system comprises the portable mobile communication device and a server, which is in communication with the portable mobile communication device over the communication network. The portable mobile communication device will process a plurality of instructions of the mobile application adapted to send the plurality of information for translation and to receive the plurality of information after translation over the communication network. A display unit displays a user interface of the mobile application. The user interface is configured to display the plurality of information for translation and the plurality of information received after translation.

A user can install the mobile application on any device such as a laptop, PC, tablet, Smartphone, Google Glass etc. with an internet connection. After installation the user is requested to setup his/her account by providing the requited information. The first time somebody starts the mobile application one has to define a username, so they can login with different devices at one time. Then the user can setup their information by selection of which languages they speak. When the user has setup the mobile application, he/she can act as a translator or request a translation. The translator can charge for her/his help on a monetary based price, for example, price per minute based price that is published. For receiving the payments, all users must have entered their payment details in the setup. Also users have to select how many translations they would like to do per day and during which hours. Every user of the mobile application can have basically two different roles, as a translator or request a translation or can take both roles at once. The mobile application does not need to be actively open to retrieve translation requests. By default translators will get a push notification if there is a match between translator and request. When somebody requests a translation, the server will select multiple users that fulfill the criteria such as language selection, time, etc. and will send a translation information notification request to X number of top users ranked by quality, the first one to respond with a translation information notification reply will enter the call. After the call is finished the user will rate the one that did the translation. The higher the score of the translator the more likely the translator will get new requests. This will guarantee the quality of the translators. The user can also be able to drop an additional comment about the translation service. After too many bad comments the translation applicant will be blocked.

Other objects and advantages of the embodiments herein will become readily apparent from the following detailed description taken in conjunction with the accompanying drawings.

BRIEF DESCRIPTIONS OF THE DRAWINGS

Figure 2A:
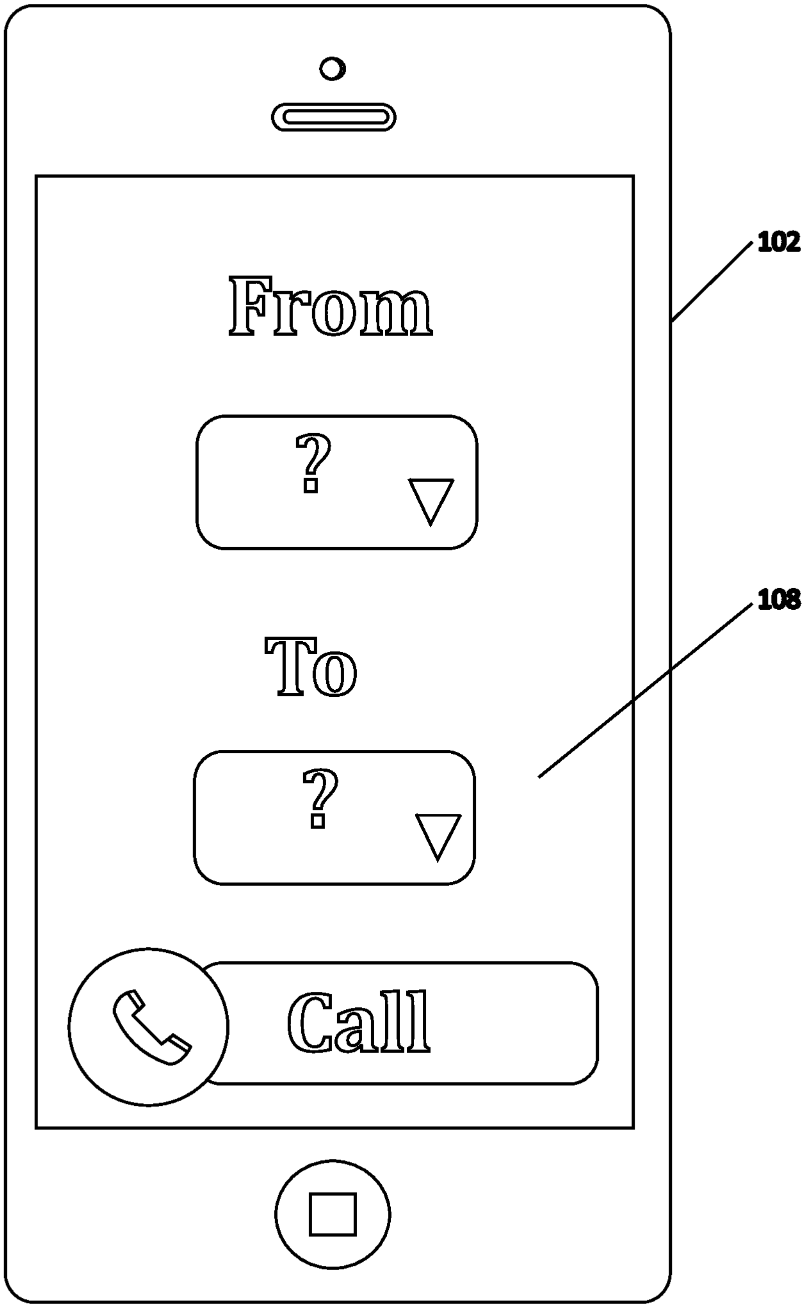
Figure 2B:
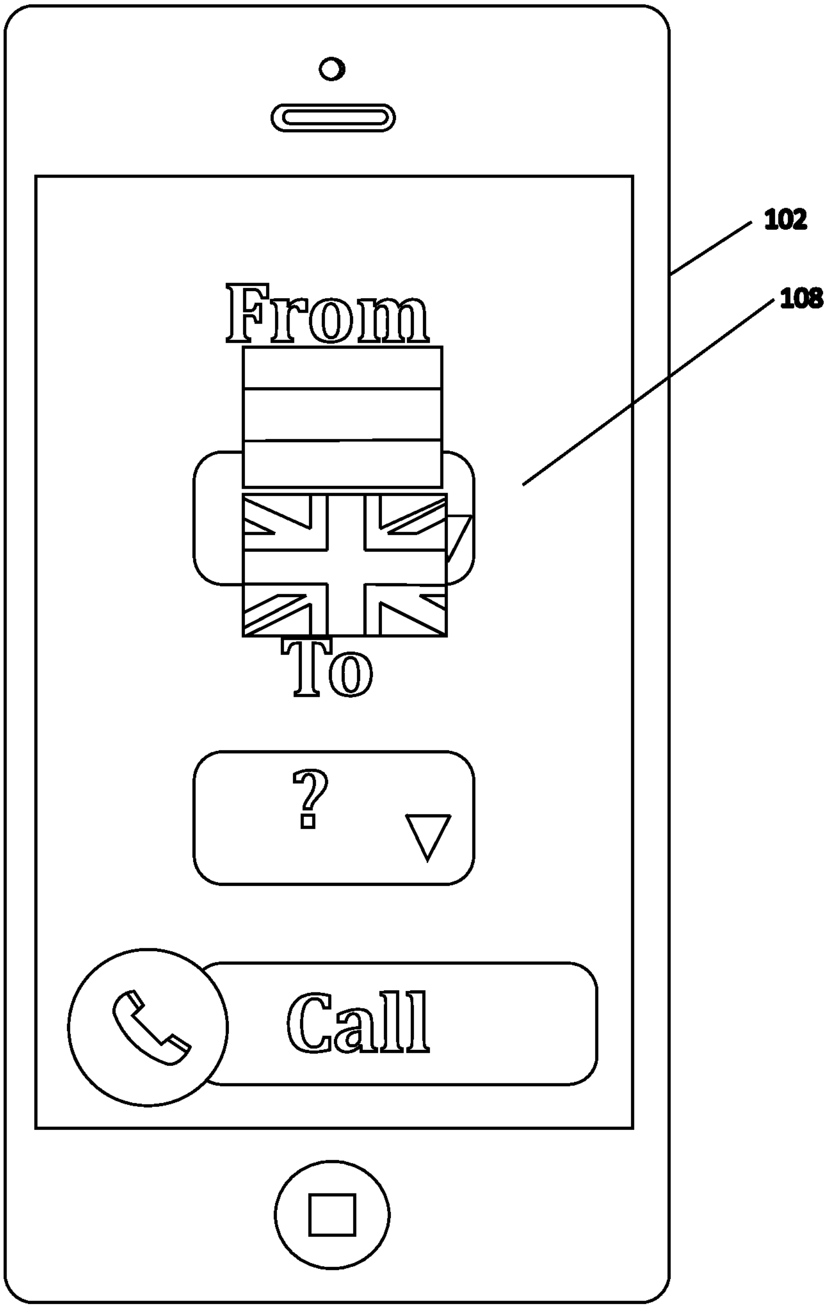
Figure 2C:
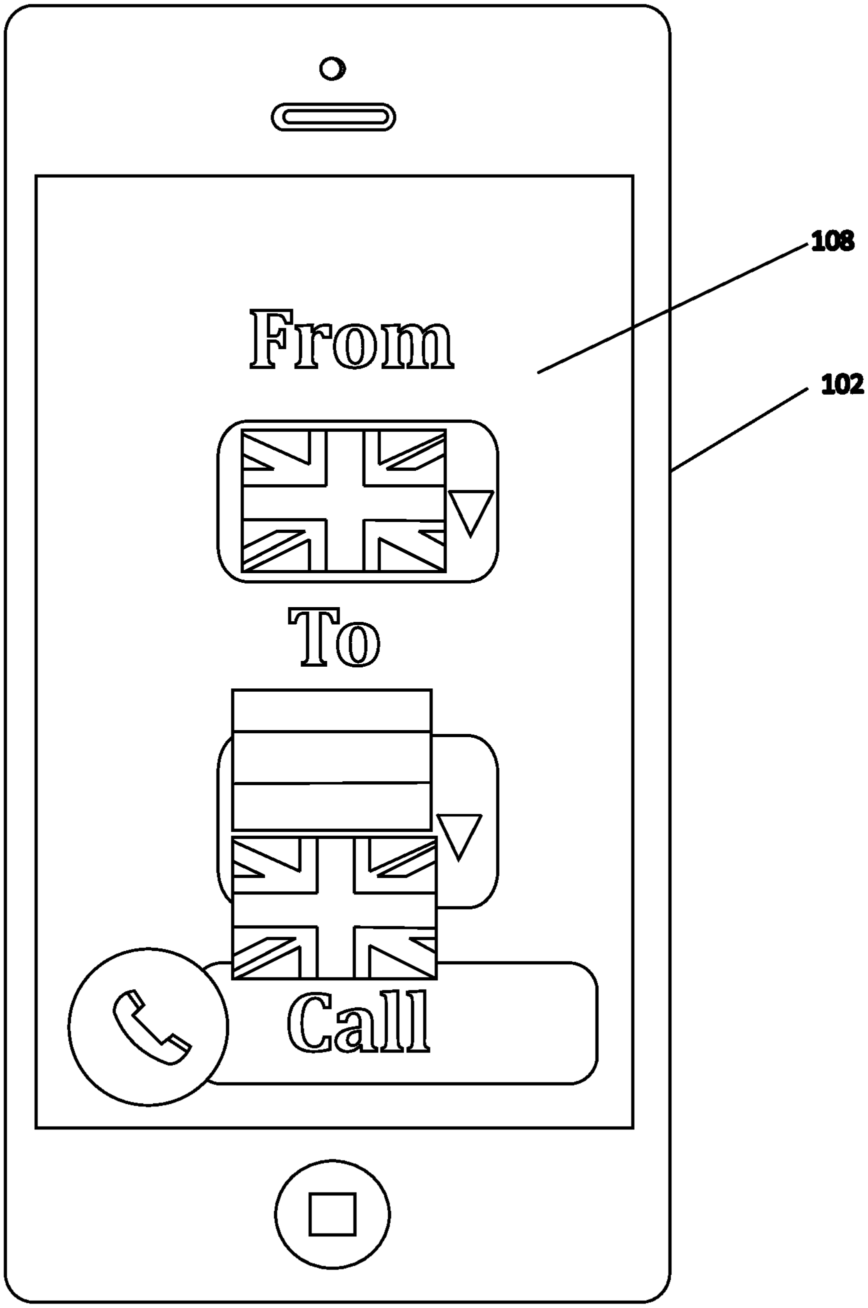
Figure 2D:
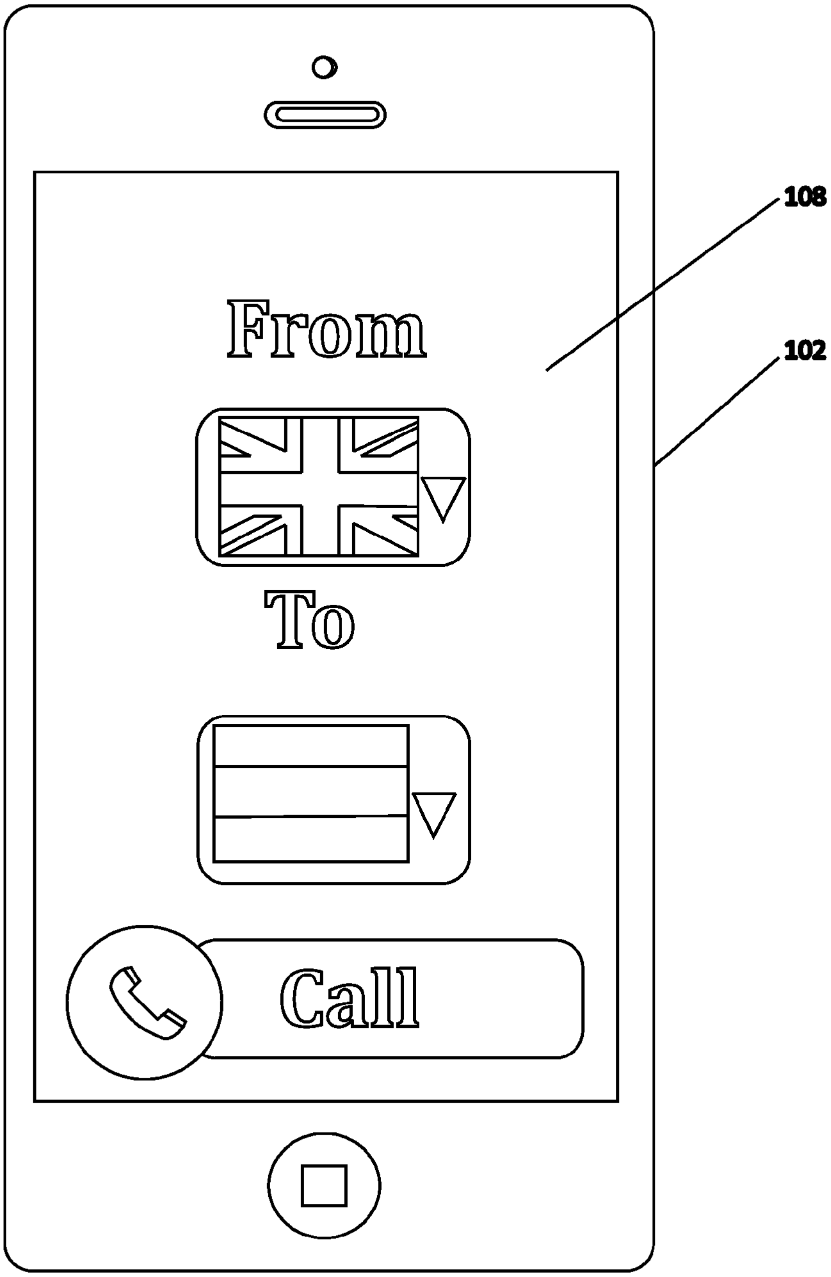
Figure 3:
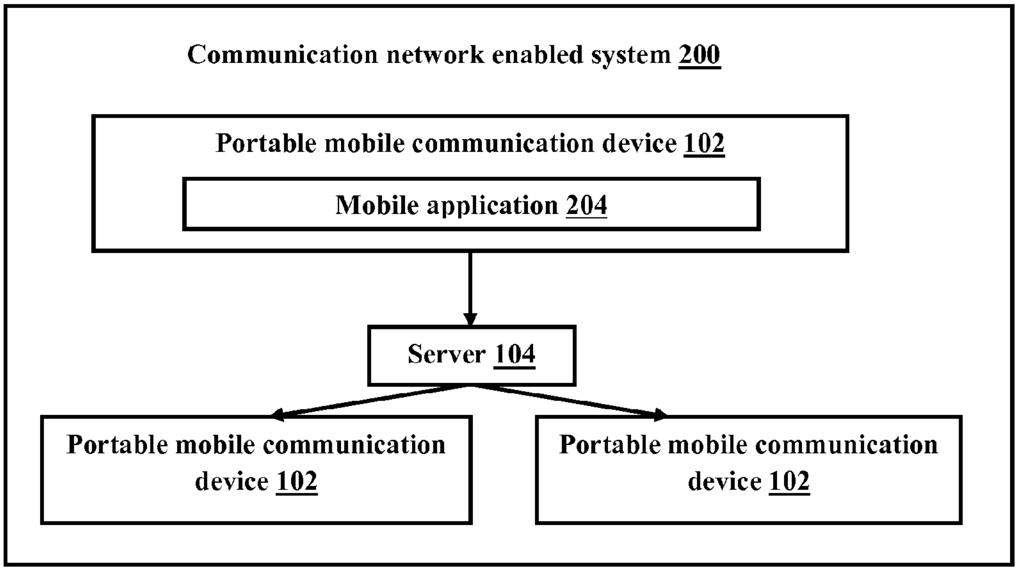
Figure 4:
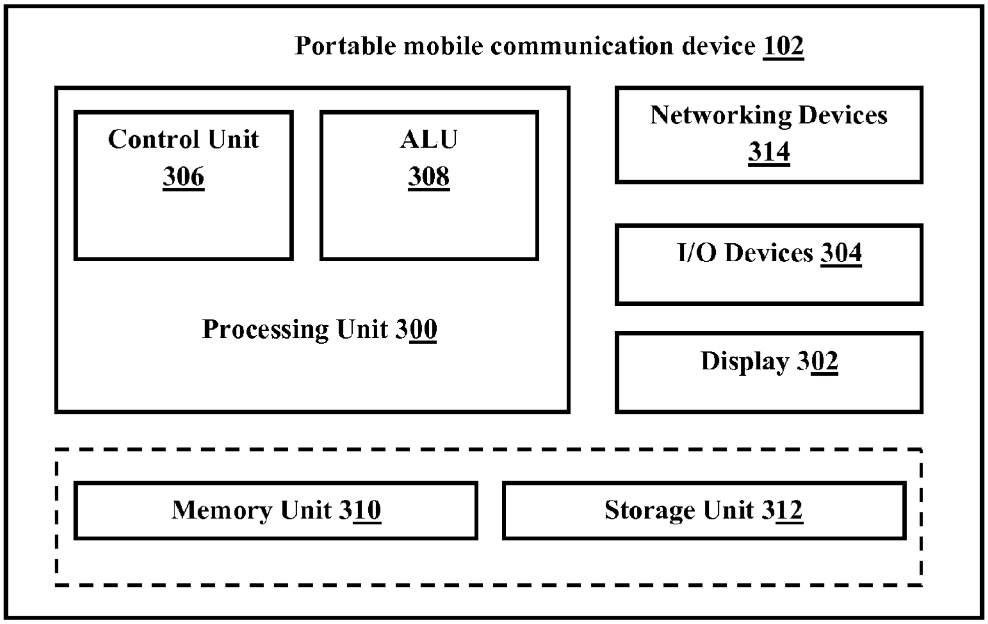
Figure 5:
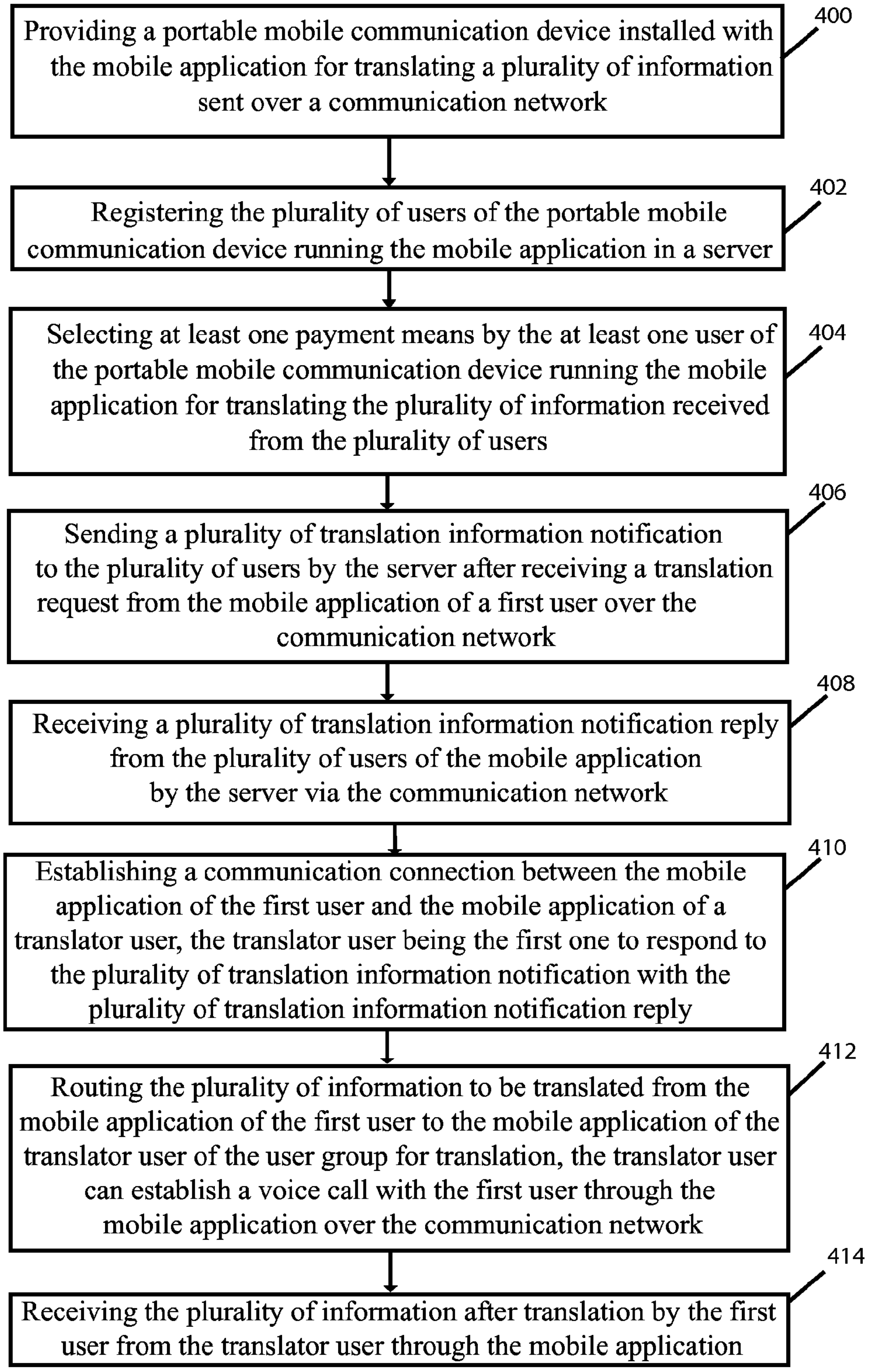

FIG. 1 illustrates a computer network environment for the purpose of translating a plurality of information sent over a communication network according to a preferred embodiment of the present invention;

FIG. 2A to 2D illustrates one example of a transition from the first display layout on a user interface of a mobile application to a layout on the user interface for translating a plurality of information according to a preferred embodiment of the present invention; and FIG. 3 illustrates a block diagram of a communication network enabled system for connecting the plurality of users for the purpose of translating the plurality of information sent over the communication network; and FIG. 4 illustrates a block diagram of the components of the portable mobile communication device; and FIG. 5 shows a flow chart showing a method of translating the plurality of information sent from the mobile application over the communication network according to a preferred embodiment of the present invention.

DETAILED DESCRIPTION

Before describing aspects of the present invention in detail, it is helpful to first discuss the environment in which embodiments of the invention operate. FIG. 1 includes a simplified illustration of a computer network environment 106. Computer network environment 106 includes a plurality of portable mobile communication devices 102*a*-102*n*, which may be used to access a server 104 at which an instantiation of a computer-based application, which provides the network-based and other features discussed below, may be installed and accessible. Such access may be by way of a computer network or wireless network of networks 106, such as a local and/or wide area network or mobile communication network. In some cases, network 106 includes the network of networks commonly known as the Internet. In other instances, network 106 may be a local area network (LAN) of an enterprise and/or a virtual LAN, which is instantiated over the Internet or other networks of networks. Server 104 is communicatively coupled to a database, which may store records concerning user credentials, user ratings, payment details, etc.

The plurality of portable mobile communication devices 102*a*-102*n* may be any form of a computer-based system, including personal computers, laptop computers, net book computers, and mobile devices such as tablet computers, smartphones, smart wearable such as Google glasses, smartwatches and the like. Generally, the portable mobile communication device 102 may run a mobile application or software application, through which the application running on the server 104 may be accessed, however, as described herein the portable mobile communication devices 102 may also run a system application specially configured to interface with the application running on the server 104. References to a smartphone below should be read as including tablet computers, portable computers (e.g., laptop computers, net books, etc.), and other forms of mobile, computer-based systems. The above said devices may run on different operating systems and their modified versions including but not limited to Windows, Linux, Android, iOS, Tizen, Jolla, Symbian etc.

In one aspect, the user interface 108 of the mobile application provides improved interaction with the mobile application executing on the portable mobile communication device 102 such as a smartphone. In an embodiment, the mobile application ("App") may have a plurality of different functions or menu options available to the user. In some embodiments, each function has a corresponding screen display layout or interface 108. Preferably, each menu option's respective screen display layout 108 may occupy most or substantially the entire device display screen. The term "screen display layout" is used to refer content that appears on the device display screen at a given time. Some additional aspects of the present user interface include arrangements for viewing and selecting among the various different functions or menu options that may be available during execution of the given mobile application. In an embodiment, upon selection of a function, the selected function user interface 108 then occupies most or substantially the entire device display screen. In this way, available display screen "real estate" is maximized for each function or feature of the running mobile application.

Referring now to FIG. 2A, it shows one example of a screen display layout 108 on a display screen of the portable mobile communication device 102 in which the mobile application is running. Here, the screen display layout or the user interface 108 is in a first state in which the plurality of information needed to be translated can be provided by the user. The user interface includes menus for selecting a plurality of languages to which the plurality of information need to be translated in the display screen layout or the user interface 108. The menu for selecting the desired language may include text fields, buttons, selection boxed and any other suitable symbol, icon, graphic or text may be used.

While running the mobile application, the user might select, by a button, by voice command, by gestures, or screen touch, the home or main menu of the user interface 108 of the mobile application. In an embodiment, this may be done by selecting or touching an indicator near the top portion of the user interface 108 to dropdown a list of languages. For example, a downward-pointing triangle shape or the like can provide a list of languages to a user and by selecting any language from the list user can specify to which language the plurality of input information is provided. A similar dropdown menu at a bottom portion of the user interface of the mobile application enables the user to select the output language to which the plurality of input information is to be translated. Then the use interface 108 includes a call button portion. After selecting the input language, which is the language in which the plurality of information is providing and the replay language, which is the language to which the plurality of information need to be converted, the call button on the user interface 108 can be enabled by a button, by voice command, by gestures, or screen touch or the like.

Preferably, the present user interface 108 is implemented in software. Details of such software will be readily accessible to persons skilled in the art, in view of this disclosure, using modern software development libraries and tools. The present user interface 108 can be used in conjunction with, or implemented in, almost any software application, especially on portable, wireless devices.

FIGS. 2B, 2C and 2D illustrates one example of a transition from the first display layout on the user interface shown in FIG. 2A to a second layout on the user interface. Preferably, the transition is animated, to mimic pulling down a window the display, sliding a window sideways, etc in a variety of directions. In other embodiments, it may transition laterally or from bottom to top or sideways. In other embodiments, a different transition may be used. FIG. 2A, to 2D show simple interfaces where a user can select the language from what to what one wants to translate something. When the user has selected the desired languages one can place the call and one will be connected to somebody who can translate in this example from English to German. FIG. 2A shows the start screen and the user can select languages. In FIG. 2B, in this example the user can select to translate from German or English. In FIG. 2C the user can select to translate to German or English and finally in FIG. 2D the user can "call" so he/she will be connected to somebody who can translate from English to German. After the call is finished the user will rate the one that did the translation, using 1 to 5 stars. The higher the score of the translator the more likely the translator will get new requests. This will guarantee the quality of the translators. The user can also be able to drop an additional comment about the translation service.

The user can launch the mobile application installed within the portable mobile communication device 102 for performing translation of the plurality of information that may be captured using the portable mobile communication device 102. Upon launching, the mobile application displays a user interface 108 showing various options. When the user is launching the mobile application for the first time, the user is requested to register to the application by providing a plurality of answers to a plurality of queries. The queries include the languages the user is willing to translate, proficiency levels for each language, payment receiving information such as credit card information, number of translations possible over a particular period of time, etc. This information is sent to the server 104 through the wireless network. The server 104 includes a repository for storing the plurality of information from the plurality of users having the mobile application. The server 104 runs a software for managing the plurality of information received from the mobile application running on the plurality of portable mobile communication devices 102. In a preferred embodiment of the present invention, the mobile application uses the internet connection to connect the different users. The users will connect via the server 104 and their information will not be shared. The mobile application can run on any machine with an internet connection, speaker and microphone. Therefore anybody with a laptop, PC, tablet, Smartphone, Google Glass etc. can use it.

Each user of the mobile application, after registration, will receive his/her unique user credentials for logging into the mobile application. After logging in, the users can go through different options for providing the plurality of information needed to be translated. The mobile application provides facility to attach text, audio, video, images, etc for translation. For this the user first needs to select the input language which the user is providing information for translation as in FIG. 2B. User can pull the dropdown menu in the user interface 108 using any gesture, touch or button. The pull-down menu will show the different languages by their corresponding country flags. In some embodiments the pull-down menu will show the different languages by showing the language names. In yet another embodiment language the pull-down menu will show the different languages by language name with the corresponding country flag images. The user can select both the input language and the output language in the same page of the user interface 108. After selecting both the input and the output language, the information to be translated can be provided to the mobile application. The user can attach text, audio, video, images, etc for translation. For this the mobile application can access microphone, camera and local storage of the portable mobile communication device 102. If the input method is text, then the text can be entered through a text field provided in the user interface 108 of the mobile application. If the input method is audio, then the mobile application will start the microphone to listen and record the audio and if the input method is video, then the mobile application will start the microphone and camera to listen and record the audio and video to a memory unit of the portable mobile communication device 102. The user can access the camera from the mobile application to capture any particular image containing data for translation, such as a hotel food menu, sign boards, names of locations, etc. The data will be stored in the memory unit for transfer to the server over the network 106. Once the plurality of information is received by the mobile application, then the user can activate a call option to send the data to the plurality of users through the server 104. The plurality of information is sent from the portable mobile communication device 102 through internet and the server upon receiving a plurality of translation request will first authenticate the user by checking the user credentials. If it is valid then a plurality of translation information notification is routed to a plurality of users selected from a user group. The user group is created by the server 104 containing a plurality of users based on the languages known, ratings obtained by each user, etc. The server 104 includes multiple user groups for effective routing and translation of the plurality of information.

The software running on the server 104 manages the mobile application running on the plurality of portable mobile communication device 102. The server 104 stores the information regarding the plurality of users in a database utility associated with the server 104. The software running on the server 104 ranks each user, whoever opted in as translator based on the quality of translation and any feedback results obtained from other users. At least one list is created with plurality of users having knowledge of a particular language. Users with highest ranking will be placed on top of the list and are contacted first for translating the particular language. The server 104 will send the translation information notification request to translate to multiple possible translators, and the first one to respond/pick up, will enter the call and receive all the information sent through the mobile application by the user. Once a link between the user and a translator from the list of translators has been established, the data such as video, picture and/or text will be sent and the call is open, so the user and the connected translator can talk. The translator can enter a charge price/per minute for each individual language. For each successful translation, the translator delivering the translation will receive a payment through any payment means such as the amount will be credited to his/her account registered with the mobile application.

Referring now to FIG. 3, a communication network enabled system 200 for connecting the plurality of users for the purpose of translating the plurality of information sent over the communication network according to a preferred embodiment of the present invention is disclosed. The communication network enabled system 200 comprises a mobile application 204 installed in the portable mobile communication device 102 for receiving the plurality of information from the plurality of users. The user can download the mobile application 204 to their portable mobile communication device 102. The plurality of information in one language can be translated to a second language by using the mobile application 204. The plurality of information is translated to a language, which is at least one the user of the portable mobile communication device can understand. The communication network enabled system 200 comprises the portable mobile communication device 102 and the server 104, which is in communication with the portable mobile communication device 102 over the communication network 106 such as through internet connectivity. The portable mobile communication device 102 includes a processing unit for processing a plurality of instructions of the mobile application adapted to send the plurality of information for translation and to receive the plurality of information after translation over the communication network 106. The plurality of information collected by the mobile application 204 can include a text, video, audio or an image, which the user is requesting to get translated into a different language understandable by the user. In addition, the mobile application 204 can access a memory unit for receiving the plurality of information including the video, audio, text or image. The memory unit can also store the plurality of information received by the mobile application 204 after translation. The network communication unit enables the user to send the plurality of information for translation and for receiving the plurality of information after translation from within the mobile application 204. The network communication unit is capable of connecting the portable mobile communication device 102 to the internet for both transferring and receiving the plurality of information. A display unit displays a user interface of the mobile application 204. The user interface is configured to display the plurality of information for translation and the received plurality of information after translation.

The server 104 includes similar hardware as in a computer system which includes the processor, network communication unit, memory unit, a plurality of I/O devices, display unit, operating system software, firmware, and the specialized application for controlling the operations of the mobile application 204 running on all the portable mobile communication devices 102. The server 104 includes a database utility for storing a plurality of information of the plurality of users. The server 104 includes routing methods for fast and efficient translation of the plurality of information send from the mobile application 204 running on the portable mobile communication devices 102. The software running on the server 104 keeps a variety of lists containing the plurality of users having knowledge of a particular language. Users having knowledge of a particular language will be grouped to form at least one user group. The software running on the server 104 ranks each user in the user group based on the quality of translation and any feedback results obtained from other users. Users with highest ranking feedback will be placed on top of the list and are contacted first from the user group for translating the particular language. The translator can enter a charge price/per minute for each individual language. For each successful translation, the person delivering the translation will receive a payment through any payment means such as the amount will be credited to his/her account registered with the mobile application. Users frequently sending incorrect or poorly translated information will be blocked and may be removed from the list or the group. The mobile application 204 does not need to be actively open to retrieve translation requests. By default translators in the user group get a push notification if there is a match between translator and request.

Referring now to FIG. 4, the portable mobile communication device 102 e.g. a Smartphone, tablet, ultrabook or laptop includes at least one processing unit 300 configured to process a number of applications including the mobile application 102 of the present invention. The mobile communication device 102 includes a variety of hardware and associated software components, where the variety of hardware components include the at least one processing unit 300 designed to control various other circuits such as information displayed on a display 302. The display 302 can display the user interface of the mobile application 204. The processing unit 300 may control the information based on inputs received from various Input output (I/O) devices 304 of the mobile communication device 102 e.g. hard keys, a touch screen, voice commands from a microphone or a microphone connected to headset jack, and/or from some other user input device.

The mobile communication device 102 comprises at least one processing unit 300 that is equipped with a control unit 306 and an Arithmetic Logic Unit (ALU) 308, a memory unit 310, a storage unit 312, plurality of networking devices 314 and a plurality Input output (I/O) devices 304. The portable mobile communication device 102 can be composed of multiple homogeneous and/or heterogeneous cores, multiple CPUs of different kinds, special media and other accelerators. The processing unit 300 may also include a memory that stores data. The processing unit 300 may include only one of a type of component e.g. one microprocessor, or may contain multiple components of that type e.g. multiple microprocessors. The processing unit 300 could be composed of a plurality of separate circuits and discrete circuit elements. In some embodiments, the processing unit 300 will essentially comprise solid state electronic components such as a microprocessor e.g. microcontroller. The processing unit 300 may be mounted on a single board in a single location or may be spread throughout multiple locations which cooperate to act as processing unit 300. In some embodiments, the processing unit 300 may be located in a single location e.g. in proximity and/or on a common circuit carrying element such as a circuit board and/or all the components of the processing unit 300 will be closely connected. The mobile application 204 having an algorithm for sending the plurality of information received. The processing unit 300 is responsible for processing the instructions of the algorithm. The processing unit 300 receives commands from the control unit in order to perform its processing. Further, the plurality of processing units 300 may be located on a single chip or over multiple chips. In addition, any logical and arithmetic operations involved in the execution of the instructions are computed with the help of the ALU 306. The server 104 routes the information received from the mobile application 204 of the portable mobile communication device 102 of the first user to the plurality of users on top of the list.

The various networking devices 314 or external I/O devices 304 may be utilized for interconnecting with a variety of external devices through wireless/wired network. The mobile communication device 102 supports the interconnecting with the variety of external devices such as the server 104 through the networking unit and the I/O device unit. The mobile communication device 102 includes the plurality Input output (I/O) devices 304 e.g. button, switch, touch screen, keyboard, keypad, voice command circuit, etc. for registering commands from the user through the mobile application 204. Some or all of the plurality Input output (I/O) devices 304 may include an alphanumeric keyboard. The keyboard may comprise, for example, a QWERTY key layout and an integrated number dial pad. A keyboard integrated into a hand-held device would typically be a thumb keyboard. The plurality Input output (I/O) devices 304 may also include various keys, buttons, and switches such as, for example, input keys, preset and programmable hot keys, left and right action buttons, a navigation button such as a multidirectional navigation button, phone/send and power/end buttons, preset and programmable shortcut buttons, a volume rocker switch, a ringer on/off switch having a vibrate mode, and so forth. Any of the plurality Input output (I/O) devices 304 may be concealable behind a body e.g. a sliding body, a flip-out body, etc. such that they are hidden when the body is in a first position and visible when the body is in the second position.

FIG. 5 illustrates a method of translating the plurality of information sent to the mobile application 204 running on the portable mobile communication device 102 over the communication network 106. The method starts by installing the mobile application 204 in the portable mobile communication device as shown in block 400. The mobile application 204 installed with the portable mobile communication device 102 is capable of connecting to the communication network 106 such as the internet for the purpose of translating the plurality of information sent over the communication network 106. Then as in block 402, the plurality of users of the portable mobile communication device 102 running the mobile application 204 is registered in the server 104 by providing a plurality of user information. Every user who installs the mobile application 204 can act as a translator if he wants. For registering in the mobile application 204, each user who wants to act as a translator, a requirement form needs to be filled, which is having queries such as but not limited to which languages they speak. The filled query form is first sent to the server 104 for registering thereafter to receive the services offered by the mobile application 204. At least one user's credential is given to the registered users for accessing the mobile application 204. The plurality of information of each user is securely stored in a database utility associated with the server 104. During registering in the mobile application 204, the plurality of users can select to be a translator or only requests translations. To request the help of a translator through the mobile application 204 requires a payment. Therefore all users must provide their payment details in the setup i.e. during the registration process. The users registered as translators can select at least one payment means for translating the plurality of information received from the plurality of users as shown in block 404. The user can launch the mobile application 204 from the portable mobile communication device 102 and can select the desired language for providing input information and the language for output information. Now a plurality of translation information notification is sent by the server 104 to the portable mobile communication devices with the mobile application 204 over the communication network 106 when a translation request from the mobile application of a first user is received over the communication network as shown in block 406. Upon receiving a first translation information notification reply from at least one user, the server 104 will establish a communication connection between the mobile application of the first user and the mobile application of a translator user, the translator user being the first one to respond to the plurality of translation information notification with the plurality of translation information notification reply and the translator user being selected from the user group with the knowledge of the desired language set by the server as in block 408. The user group includes a plurality of users arranged according to their rankings. A higher ranked user will be placed on top of the list and will get the routed request for translation rather than a user placed at a lower position in the list. The plurality of users is ranked based on the quality of previous translations and also based on the feedback received from the plurality of users. The server 104 in the present invention sends the translation request as translation information notification to the top X users in the list. Users with highest ranking will be placed on top of the list and are contacted first for translating the particular language. The translation request is passed to the plurality of users as push notification, so there is no need to keep the mobile application 204 turned on all the time. Among the top X translators in the list, whomever are receiving the push notification, the first one that responds will be connected to the user for doing the translation through the mobile application. This establishes a communication connection between the mobile application of the first user and the mobile application of a translator user, the translator user being the first one to respond to the plurality of translation information notification with the plurality of translation information notification reply as in block 410. Then, the plurality of information to be translated from the mobile application of the first user is now routed to the mobile application of the translator user of the user group for translation, the translator user can establish a voice call with the first user through the mobile application over the communication network as in block 412. The server 104 will send a request to translate to multiple possible translators, and the first one to respond/pick up, will enter the call and receive all the information sent through the mobile application by the user. Once a link between the user and a translator from the list of translators has been established, the data such as video, picture and/or text will be sent and the call is then open, so the user and the connected translator can talk. After receiving the plurality of information after translation by the first user from the translator user through the mobile application as in block 414, the first user can provide feedback about the quality of the translation. The translator can enter a charge price/per minute for each individual language. For each successful translation, the translator delivering the translation will receive a payment through any payment means such as the amount will be credited to his/her account registered with the mobile application.

The mobile application 204 installed in the portable mobile communication device 102 is capable of transferring the plurality of information in the forms of video, audio, text or an image selected by the first user to the server 104 over the communication network 106 for the purpose of translating the plurality of information to a desired language set by the first user. The mobile application 204 ensures fast and reliable translation of the input data. The plurality of users of the mobile application 204 need to register only once during the initial setup of the mobile application 204 for receiving the user credentials. Later on, every time the user launches the mobile application 204 it will automatically get redirected to the translation information page of the user interface.

In one embodiment of the present invention, the plurality of users of the mobile application 204 installed in the portable mobile communication device 102 is requested to answer the plurality of pre-determined queries provided by the server 104 to receive at least one user credentials for using the mobile application 204. The plurality of pre-determined queries include information regarding a plurality of languages capable of translating by the user, payment required for translating each language, number of translation requests to be made or received per day, etc. Based on these queries, the answers will be stored in the server 104 based upon which the user interface of the mobile application 204 can be modified. i.e. each user of the mobile application 204 may receive a personalized user interface based on the user preferences. For example, if a user selects the language known as English and Spanish, then these languages will be shown as first preferences in the output language field. The server 104 may not store the plurality of information routed through it thereby protecting the privacy of the users. The mobile application 204 does not require to be actively running for receiving and sending translation requests. Instead the server 104 sends the translation requests as push notifications to the respective users for translation. The user interface of the mobile application 204 may include options for providing feedback for the translated results. The feedback scores will be sent to the server 104 for updating the ranking of the corresponding users. This will increase the chance a user may receive future translation requests from the server 104 as an increase in ranking will help in moving the user up to a top position in the list of user groups.

A computer program product such as the mobile application 204 and the software running in the server 104 is stored in a computer readable storage means structured to store a plurality of instructions executable by a processor in a portable mobile communication device 102. The plurality of instructions, when executed cause the processor to receive the plurality of information from a first user through the user interface of the portable mobile communication device 102 for the purpose of translating the plurality of information to a desired language set by the first user. The user interface includes provisions for the user to select a desired language to be translated. The server 104 sends the translation request notification to the top X users in the ranked list. The translation request notification is passed to the plurality of users as push notification, so there is no need to keep the mobile application 204 running all the time. Among the top X translators in the ranked list, those who are receiving the push notification, the first one to respond to the notification will be connected to the user for doing the translation through the mobile application 204. The first one to respond/pick up, will enter the call and receive all the information, such as video, picture and/or text, sent through the mobile application by the user. The translator can enter a charge price/per minute for each individual language. For each successful translation, the translator delivering the translation will receive a payment through any payment means such as the amount will be credited to his/her account registered with the mobile application 204. A feedback regarding the quality of the translated information received in the portable mobile communication device 102 of the first user is sent to the server 104 for updating the ranking.

The mobile application 204 will connect different users with the goal that they are able to help each other to translate any information sent over the communication network. In this mobile application 204 there are two types of users such as translators and translation applicants. A user has the option to be either a translator or a translation applicant or both. Each user can setup how many languages they speak and how often they would like to act as a translator during initial configuration of the mobile application 204. The mobile application 204 offers wide use for its users by providing translation between large ranges of languages. The mobile application 204 is especially suitable in situations including in a restaurant conversation, can acts as a local guide on holidays, while asking for directions, acts as a translator in negotiations, can help in resolving problems in hotels, hospitals, provide help in understanding foreign documents, etc.

A user can install the mobile application 204 on any device such as a laptop, PC, tablet, Smartphone, Google Glass, etc. with an internet connection. After installation the user is requested to setup his/her account one time, by providing the required information. The first time a user starts the mobile application 204 one has to define a username, so they can login with different devices at the same time. Then the user can setup their information by selection which languages they speak. When the user has setup the mobile application 204, he/she can act as a translator or request a translation. The translator can charge for her/his help monetary based price, for example, based on a per minute based price that is published. For receiving the payments, all users must have entered their payment details in the setup. Also users have to select how many translations they would like to do per day and during which hours. So the users can exclude night time or/and office hours. Every user of the mobile application 204 can have basically two different roles, as a translator or request a translation or can take both roles at once. The mobile application 204 does not need to be actively open to retrieve translation requests. By default translators get a push notification if there is a match between translator and request. When a user would request a translation, the server 104 will select multiple users that fulfill the criteria such as language selection, time, etc. and will send a message to X number of top users ranked by feedback, the first one to respond will enter the call. After the call the user can provide feedback which includes reporting the translation quality or when a user is abusing the service. After too many bad reports the translation user will be blocked.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the invention with modifications. However, all such modifications are deemed to be within the scope of the claims.

We claim:

1. A communication network enabled system connecting a plurality of users for the purpose of translating a plurality of information sent over a communication network comprising:

a mobile application installed in a portable mobile communication device capable of receiving a plurality of information from at least one user, the plurality of information being translated to understand the at least one user of the portable mobile communication device, the portable mobile communication device comprising:

a processing unit for processing a plurality of instructions of the mobile application adapted to send the plurality of information for translation and to receive the plurality of information after translation over the communication network;

a memory unit for storing the plurality of information including the plurality of information for translation and the plurality of information after translation;

a network communication unit for sending the plurality of information for translation and for receiving the plurality of information after translation from within the mobile application, wherein the receiving of the plurality of information after translation by a first user from a translator user is through the mobile application;

a display unit for displaying a user interface of the mobile application, the user interface being configured to display the plurality of information for translation and the plurality of information received after translation; and at least one server for authenticating the plurality of users of the mobile application running on the portable mobile communication device, wherein the at least one server connected to the plurality of portable mobile communication devices running the mobile application via the communication network routes the plurality of information from and/or to the mobile application.

2. The system of claim 1 wherein the plurality of users of the mobile application installed in the portable mobile communication device is provided with a plurality of user credentials for logging into the mobile application, wherein the plurality of users logged in using the user credentials forms at least one user group set by the server connected to the communication network, the least one user group includes the plurality of users with knowledge of a plurality of specific languages.

3. The system of claim 1 wherein the mobile application is configured to receive the plurality of information for translation from the plurality of users, the plurality of information includes at least one video, audio, text and any other information collected by the portable mobile communication device.

4. The system of claim 1 wherein the plurality of information collected by the portable mobile communication device by a first user is transferred to the at least one user group via the communication network, a plurality of translation information notification is provided to the portable mobile communication devices of the plurality of users from the at least one user group determined by the server in form a push notification for the purpose of translating the plurality of information to a desired language set by the first user.

5. The system of claim 4 wherein the mobile application allows the first user to select a desired language to which the plurality of information to be translated, wherein the plurality of translation information notification is send to the plurality of users capable of translating the plurality of information sent by the first user, wherein the plurality of users is determined by the at least one server from the at least one user group.

6. The system of claim 1 wherein the processing unit processes the plurality of instructions of the mobile application related to the plurality of information sending from and receiving to the portable mobile communication device using the mobile application for providing an output compatible with the portable mobile communication device of the first user.

7. The system of claim 1 wherein the plurality of information is send from the portable mobile communication device to the at least one server via the network communication unit of the portable mobile communication device, wherein the plurality of information sending from and receiving to the portable mobile communication device is stored in the memory unit for presenting on the user interface displayed on the display unit.

8. The system of claim 1 wherein the plurality of information received from a translator user of the at least one user group selected by the at least one server includes the plurality of information translated into a language desired by the first user, wherein the plurality of information received by the at least one server from the translator user of the at least one user group selected by the at least one server is transferred to the first user via the communication network.

9. A method of translating a plurality of information sent from a mobile application over a communication network, the method comprising:

providing a portable mobile communication device installed with the mobile application, the portable mobile communication device is capable of being connecting to the communication network for connecting to a plurality of users for the purpose of translating the plurality of information sent over the communication network;

registering the plurality of users of the portable mobile communication device running the mobile application in a server;

selecting at least one payment means by the at least one user of the portable mobile communication device running the mobile application for translating the plurality of information received from the plurality of users;

sending a plurality of translation information notification to the plurality of users of the mobile application by the server after receiving a translation request from the mobile application of a first user over the communication network, the plurality of users being part of a user group set by the server;

receiving a plurality of translation information notification reply from the plurality of users of the mobile application by the server via the communication network;

establishing a communication connection between the mobile application of the first user and the mobile application of a translator user, the translator user being the first one to respond to the plurality of translation information notification with the plurality of translation information notification reply, wherein the translator user being selected from the user group with the knowledge of the desired language set by the server;

routing the plurality of information to be translated from the mobile application of the first user to the mobile application of the translator user of the user group for translation, the translator user can establish a voice call with the first user through the mobile application over the communication network; and receiving the plurality of information after translation by the first user from the translator user through the mobile application.

10. The method of claim 9 wherein the mobile application installed in the portable mobile communication device is capable of transferring the plurality of information selected by the first user to the translator user over the communication network for the purpose of translating the plurality of information to a desired language set by the first user.

11. The method of claim 9 wherein the mobile application installed in the portable mobile communication device enables registering of the plurality of users to at least one computer application running on the server using the at least one user credentials, the at least one computer application manages the mobile application running on the plurality of portable mobile communication devices for fast and efficient translation of the plurality of information sent from the portable mobile communication device using the mobile application.

12. The method of claim 9 wherein the plurality of users of the mobile application installed in the portable mobile communication device is prompted to answer a plurality of pre-determined queries provided by the server to receive at least one user credentials for using the mobile application, the plurality of pre-determined queries include information regarding a plurality of languages capable of translating by the user.

13. The method of claim 9 wherein the plurality of translation information notification can be routed to the plurality of users from the user group selected by the server for the purpose of translating the plurality of information to the desired language set by the first user, the plurality of translation information notification is sent from the computer application in the server in form of push notification to the plurality of users selected by the server.

14. The method of claim 9 wherein the translator user is selected from the first received plurality of translation information notification reply by the server from the plurality of users and the communication connection is established between the first user and the translator user through the mobile application for transferring the plurality of data including audio, video and/or text data for translation.

15. The method of claim 9 wherein the translator user of the mobile application installed in the portable mobile communication device is entitled to receive the at least one payment means for translating the plurality of information.

16. The method of claim 9 wherein the plurality of users of the mobile application installed in the portable mobile communication device is able to set a plurality of parameters including time and frequency of translation requests and rate for translation of each language.

17. The method of claim 9 wherein each of the plurality of users from the user group is ranked by the computer application running in the server based on a plurality of feedbacks regarding quality of translation received from the plurality of users.

18. The method of claim 9 wherein the plurality of translation information notification for translation is routed to the plurality of users with top ranking values from the user group selected by the server.

19. A computer program product comprising a non-transitory computer readable storage medium structured to store instructions executable by a processor in a portable mobile communication device, the instructions, when executed cause the processor to:

receiving a plurality of information from a first user through a user interface of a portable mobile communication device for the purpose of translating the plurality of information to a desired language set by the first user, the user interface includes provisions to provide a desired language to be translated;

storing the plurality of information on a memory unit;

sending a plurality of translation information notification to a plurality of users of a user group selected by the server with the knowledge of the desired language by the server;

receiving a translation information notification reply from a translator user by the server;

creating a direct communication connection between the first user and the translator user sending the translation information notification reply through the mobile application installed in the portable mobile communication device;

translating the plurality of information received from the first user through the user interface of the portable mobile communication device by the translator user and sending a feedback regarding a quality of the translated information received from the translator user using the mobile application in the portable mobile communication device to the server, wherein the translated information from the translator user is received by the first user through the mobile application.

* * * * *